May 5, 1931.  C. BORNMANN  1,803,313
PICTURE PROJECTOR
Filed March 26, 1928
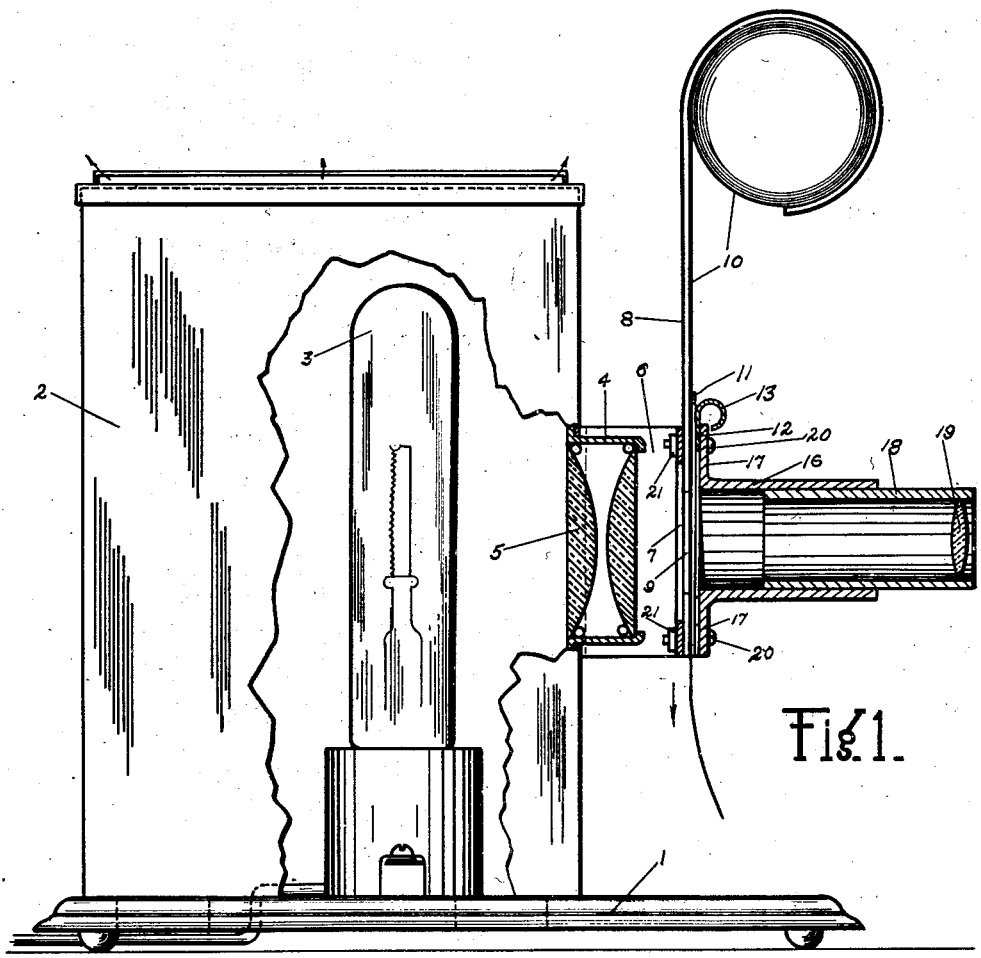
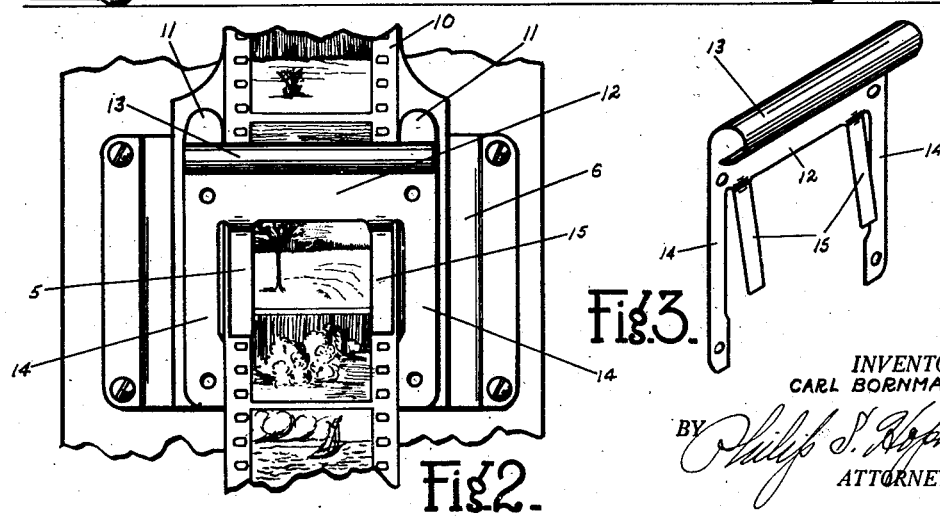
INVENTOR.
CARL BORNMANN.
BY
ATTORNEYS.

Patented May 5, 1931

1,803,313

UNITED STATES PATENT OFFICE

CARL BORNMANN, OF BINGHAMTON, NEW YORK, ASSIGNOR TO AGFA ANSCO CORPORATION, OF BINGHAMTON, NEW YORK

PICTURE PROJECTOR

Application filed March 26, 1928. Serial No. 264,944.

My invention relates generally to projectors for pictures, particularly of that type adapted for the projection of a series of pictures printed upon film and adapted to be shown in a screen one at a time.

The primary object of my invention is to provide such a projector with a normal type of film gate through which the film may be guided and passed in alignment with the projector light and lenses whereby to be shown on a screen for viewing.

Other objects and advantages in details of construction and operation will be apparent as the description proceeds, reference now being had to the figures of the accompanying drawing wherein like reference numerals indicate like parts.

In the drawing:—

Figure 1 is a side view of my improved projector, parts being broken away and certain other parts in section for clearness of illustration.

Figure 2 is a detail front view of a portion of my projector illustrating clearly the film clip and guide thereof.

Figure 3 is a detail perspective view of the film clip per se.

The reference numeral 1 indicates a base or stand upon which is mounted a lamp housing 2 contained within which is a projector lamp 3 of any desired or preferred form.

The lamp housing 2 is provided on one side with an opening within which is secured a lens mount 4, containing the condenser lens 5. Also secured to the lamp housing adjacent the lens mount 4 and projecting beyond the same is a bracket 6 provided with an opening 7 in its front side in alignment with the condenser lenses 5. Secured to the front side of this bracket 6 is a film holder 8 provided at its lower end with an opening 9 in alignment with the opening 7 and of a size equal to the size of the picture frame on the film 10. The upper end of the film holder 8 is bent over to form a receptacle for loosely receiving a coil of film 10. This film holder 8 is preferably made of spring metal or some suitable material of smooth surface so as to not scratch the film 10 as it is moved in contact with the holder 8.

Secured to the front surface of the film holder 8 and directly on either side of the film 10 are the guide strips 11, the inner edges of which are adapted to guide the edges of the film 10 as it is moved downwardly or upwardly past the exposure window.

Also mounted on the front side of the film holder 8 is a film guide 12, comprising an upper forwardly curled edge 13, behind which the film 10 is adapted to be fed downwardly and guided past the windows 7 and 9, and downwardly depending side strips 14 by means of which the guide may be secured in position as hereafter described. In addition, this film guide 12 is provided between the outer sides 14 with two downwardly depending spring fingers 15, so positioned as to overlie and engage frictionally with the perforated edges of the film 10 just outside the picture areas thereof. This film guide 12 is of course open through its body portion so as to not obstruct the passage of the projected picture therethrough.

Also mounted forwardly of the film carrier 8 and directly in front of the film guide member 12, is a hollow tube 16, provided with the securing flanges 17, and projecting outwardly. Slidable within this tube 16 is a focusing barrel 18 provided with a lens 19 whereby the focus of the image on the film may be adjusted for given distances.

All of the parts just described, including the film holder 8, the guide strips 11, film guides 12, and the securing flanges 17 of the barrel 16 are all securely mounted in their assembled position as shown in Figure 1 by means of the screws 20 and nuts 21, to the front wall of the bracket 6. It will be observed with reference to Figure 1 that the edge guide members 11 are of sufficient thickness to properly space the film guide 12 from the film carrier 8 in order to permit the ready passage of the film 10 between these elements and past the exposure windows 7 and 9. The tension of the spring fingers 15 however against the edges of the film 10 is sufficient to prevent accidental movement of the film.

Of course, changes may be made in details of construction and arrangement of parts without departing from the spirit and scope of my invention. I do not limit myself therefore to the exact structure herein shown and described other than by the appended claim.

I claim:—

A film guide for projectors comprising a strip of material provided with means for holding a coil of film and with an opening past which said film is adapted to be moved, and guiding means for said film comprising a frame having a rolled upper edge and resilient fingers adapted to engage the film adjacent its edges, and spacer members between said strip of material and said guiding means, said members providing guiding means for the extreme edges of said film strip.

CARL BORNMANN.